United States Patent [19]

Schatschneider

[11] 4,383,822

[45] May 17, 1983

[54] REFRACTORY SHEATHING MADE FROM INSULATING SHAPES FOR VERTICAL SUPPORT MEMBERS IN HEAT-TREATING FURNACES

[75] Inventor: Peter Schatschneider, Rommerskirchen, Fed. Rep. of Germany

[73] Assignee: Bloom Engineering (Europa) GmbH, Dusseldorf, Fed. Rep. of Germany

[21] Appl. No.: 294,136

[22] Filed: Aug. 19, 1981

[30] Foreign Application Priority Data

Aug. 26, 1980 [DE] Fed. Rep. of Germany ....... 3032174

[51] Int. Cl.[3] .......................... F27D 1/00; F27D 3/02; F16L 9/00; F16L 9/14

[52] U.S. Cl. .................................... 432/247; 138/149; 138/162; 138/163; 138/166; 432/234

[58] Field of Search ................ 432/234, 247; 138/148, 138/149, 162, 163, 166

[56] References Cited

U.S. PATENT DOCUMENTS

| | | | |
|---|---|---|---|
| 3,095,014 | 6/1963 | Doskes | 138/162 |
| 3,631,789 | 1/1972 | Kinsey | 138/163 |
| 3,927,698 | 12/1975 | Johannsen | 138/162 |
| 4,275,771 | 6/1981 | Campbell, Jr. | 432/234 |

FOREIGN PATENT DOCUMENTS

| | | | |
|---|---|---|---|
| 74402 | 7/1970 | German Democratic Rep. | 138/162 |

OTHER PUBLICATIONS

"Burton-Schornsteinelemente" Brochure Dated Jan. 1, 1968.

*Primary Examiner*—John J. Camby

*Attorney, Agent, or Firm*—Webb, Burden, Robinson & Webb

[57] ABSTRACT

A refractory sheathing made from insulating shapes for vertical support members, in particular riser pipes, in heat-treating furnaces, e.g., pusher furnaces, comprises an inner layer made from a refractory, fibrous, insulating material, or an appropriately shaped article, surrounding the support members and an outer layer of positively interengaging, refractory, shell-shaped shapes of, for instance, the same height throughout, surrounding said inner layer. To avoid a large number of different shapes having to be correspondingly expensively manufactured in different moulds to match support members of different dimensions and double pipes, it is proposed that only equal-leg angle pieces of different leg lengths, in particular two different angle pieces, and straight intermediate pieces of different widths, in particular only two or three widths, be provided as shapes. All shapes have grooves on two contiguous sides at right angles and matching tongues on both of the other contiguous sides at right angles. The inner layer surrounding the support members is formed from set-up, substantially rigid, flat insulating boards.

8 Claims, 6 Drawing Figures

REFRACTORY SHEATHING MADE FROM INSULATING SHAPES FOR VERTICAL SUPPORT MEMBERS IN HEAT-TREATING FURNACES

The invention relates to a refractory sheathing made from insulating shapes for vertical support members, in particular riser pipes, so-called risers, in heat-treating furnaces, particularly pusher furnaces and walking beam furnaces fired from below, comprising an inner refractory, fibrous, insulating layer surrounding the support members and an outer layer of positively interengaging, refractory shapes of the same height throughout surrounding said inner layer.

DESCRIPTION OF THE PRIOR ART

In modern furnaces, a great variety of insulation systems are provided to protect the metal structures such as skid pipes, crossover pipes, riser pipes and other support members in pusher furnaces, rocker-bar, walking-beam and suchlike furnaces, where the support of moving and fixed horizontal beams is involved. Both the horizontal and the vertical pipes are normally water-cooled. To reduce the heat losses of the furnace and to increase the stability of the pipes, they are provided with refractory sheathings. The latter are subjected to high and cyclic temperatures, repetitive shocks, vibration, scale and scar buildup and to occasional damage from chunks of metal or scale. Consequently, they must be replaceable. For this purpose and to make it easy to install them, they are built up from shapes.

Refractory sheathings of the most varied configurations are known for the purposes mentioned. One known sheathing (German Auslegeschrift No. 17 58 785) utilizes the shapes of the same height mentioned at the beginning, which have hook-shaped projections and recesses on their side faces in order to positively interengage them in this manner. Moreover, the shapes have been given a trapezoidal form, so that a pipe can be enclosed. For pipes having considerably different diameters, shapes of different trapezoidal form are required. Only if the hook-shaped positive connection has a lot of clearance, or circular cross-section grooves are provided in the one vertical side face and, in the other vertical side face, wire-rod-shaped projections capable of engaging in the corresponding grooves, is there a largish degree of angular mobility of the shapes, permitting adaptation then to different pipe diameters provided that the shapes are of small width. However, this configuration has the disadvantage that the insulating effect is not an optimum one with a large clearance and the gap opening up inwards or outwards between adjacent shapes. Furthermore, a very large number of shapes must be put in place in installation work and result in many gaps with a lower insulation value than the other part of the shapes. The inner layer is kept resiliently compressed by the outer layer such that, owing to the reaction pressure obtained through compression, it locks the shapes in their position through the bracing in a circumferential direction on interlocking connections of adjacent shapes.

Another known refractory sheathing for riser pipes utilizes wider, likewise arcuate shapes featuring, however, one their top side short recesses and projections extending radially from the front side to the inner side (German Gebrauchsmuster No. 70 31 431), so that projections on adjacent shapes engage into recesses in a shape disposed in staggered arrangement above or below them, thus creating a positively engaged bond. These shapes must have different dimensions, depending on the diameter of the support pipe to be insulated, as their curvature is matched to the curvature of the pipe. A variety of different shapes has therefore to be stocked, so that different tasks can be catered for. Furthermore, manufacture is costly, because a provision of different moulds has to be made for the different shapes.

There are also such sheathings built up from shapes of differing height having grooves on two contiguous sides and tongues on the other two contiguous sides, in order to be placeable interlocked.

The same applies to a sheathing made of curved shapes matched to the curvature of the riser pipe or of other pipes to be insulated, in which shapes, additionally, interengaging locking connections acting in the direction of the axis of the pipe to be insulated are provided in the form of steps with projections and recesses. Shapes to be disposed one above the other can have tongues on their top side and grooves on their bottom side (German Offenlegungsschrift No. 29 02 906). Manufacture and stocking of these shapes is likewise very costly. As far as the shapes have at their top and bottom side radial recesses which engage over the radial projections of the shapes of an adjacent course, this entails the disadvantage that the stress concentration in the corners of the recesses may become so large that it leads to cracking in service. Thereby, the bond is endangered.

All the known sheathings mentioned have the inherent disadvantage that a large number of different shapes must be manufactured in different moulds to match pipes to be insulated having different diameters and to match double pipes (support pipes running parallel to each other).

SUMMARY OF THE INVENTION

The principal object of the invention is to devise a sheathing made from shapes and needing only a smaller number of different shapes which can be manufactured less expensively for a variety of different support members.

The foregoing object is achieved, in accordance with the invention, in that provision is made in the earlier mentioned refractory sheathing that the shapes comprise only equal-leg angle pieces of different leg lengths and straight intermediate pieces of different lengths, that all shapes have grooves on two contiguous sides at right angles and tongues on both of the other contiguous sides at right angles, and that the inner layer is formed from set-up substantially rigid, flat insulating boards.

The configuration of the shapes in the invention makes it possible to cater for virtually all tasks confronted in practice with only 5 to 6 different shapes. Angle pieces of different leg lengths, preferably of only two different leg lengths, enable all pipes, double pipes as well, to be embraced, intermediate pieces of different lengths being used to match up with the diameter. The two angle pieces of different leg lengths enable continuous joints parallel to the pipe axis to be avoided. Instead, the shapes can be placed in bond, i.e., the vertical joints parallel to the pipe axis are horizontally staggered from one shape course to the next. The angle pieces also enable straight, i.e., flat insulating boards which have merely to be cut to appropriate length, to be used for the inner layer of the insulation. The use of special soft mats, particularly for wrapping around the support pipes, needing special fastening if they are not to slump in the rough conditions of furnace operation, is not required. Rather, substantially rigid, commercially available insulating boards can be used which can be placed above each other without the risk of them telescoping axially.

The intermediate pieces expediently have a length equal to twice the difference between the leg lengths of the two angle pieces of different leg lengths. Thereby, small pipes can be surrounded directly by angle pieces of large leg length, whereas in the adjacent course angle pieces of small leg length are then used to obtain horizontal staggering of the vertical longitudinal joint, the remaining intermediate spacing left thereby being bridged by a single intermediate piece.

Another embodiment of the invention provides for other intermediate pieces of a length an integral multiple of the length of the aforementioned smallest intermediate piece. Thereby, larger pipes can be sheathed with few different shapes in bond, so that only a few longitudinal joints are created.

One embodiment of the invention provides for shapes having longitudinal ribs on their inner face to stand off from the insulating boards. This is an expedient development of the insulation and, additionally, a degree of bracing can be obtained. Resistance to heat transfer is increased.

The angle pieces are preferably configured inside and outside with rounded-off corners to diminish the risk of damage.

For the manufacture of the sheathing from the angle pieces of different leg lengths, preferably two different leg lengths, and intermediate pieces of different lengths, only a single mould (basic/master mould) is required. The hollow space to be filled with the refractory material is configured such that either two angle pieces or two or three intermediate pieces can be manufactured at the same time. For this purpose, the mould for the two angle pieces is connected by a straight portion for the manufacture of an intermediate piece and both of the other mould legs are lengthened such that at least one larger intermediate piece can be accommodated. In manufacture, the shapes to be manufactured are then defined laterally by inserts put into the mould and having the size of angle pieces or of intermediate pieces. Two intermediate-piece inserts thus serve for defining one angle piece to be manufactured and, vice versa, angle-piece and intermediate-piece inserts, as the case may be, for defining the hollow space for intermediate pieces to be manufactured. Thus, only a single basic mould is required, which is adapted by means of inserts to the various shapes.

With the sheathing made from special shapes as in the invention, basic pipes having an external diameter from, for example, 89–220 mm (the dimensions to be found in practice), square and rectangular pipes of, for example, 100×100 and 100×200 mm, as well as double or tandem pipes from the named single pipes can be sheathed.

Owing to the reduction in manufacturing costs from the simplified mould configuration enabling the restriction to just a few different shapes, rapid availability of the shapes can be obtained with a smaller inventory.

These advantages are also present in another development of the sheathing having a roof-shaped covering cap made from shapes overhanging the pipe sheathing on its top side and reaching to close to the support member. Such covering caps made from laterally positively interengaging semi-circular shapes are known. It is now proposed in the invention that the covering-cap shapes are formed as equal-leg angle pieces (of equal or different leg length) and, if applicable, straight intermediate pieces and that these shapes have, on their bottom side, a recess which positively engages over the top side of the shapes of the support member sheathing. The side faces of the covering-cap shapes are expediently configured step-shaped with positively interengaging projections and recesses (joggled).

The provision of such a covering cap at the top end of the sheathing increases the capability of the latter to withstand shocks. Efficient manufacture of the shapes by machinery, just as that of the pipe-sheathing shapes, is possible at favourable cost. Through the special design of the cap and an appropriate selection of materials, the pipe sheathing is protected against foreign matter, scale and slag trickling in.

All shapes have very high dimensional and mating accuracy, because only one basic manufacturing mould is utilized.

Through the change-over from a round sheathing to a square or rectangular sheathing, the insulation of the riser pipes is improved and the working life of the sheathing is prolonged. These advantages are not counterbalanced by the greater amount of material used.

Two embodiments of the invention, by way of example, are explained with the help of the drawings, in which FIG. 1 is a perspective view of a riser pipe with partly visible inner layer and an outer layer made of shapes, FIG. 2 is a sheathing like that in FIG. 1 for a wider riser pipe, FIG. 3 is a cross section through a basic/master mould for manufacturing the sheathing shapes in FIGS. 1 and 2, FIG. 4 is a view of a pipe sheathing with a covering cap, FIG. 5 is a plan view of the covering cap in FIG. 4 and FIG. 6 is a view of a covering-cap shape in FIGS. 4 and 5.

DESCRIPTION OF THE PREFERRED EMBODIMENTS

Figure 1:
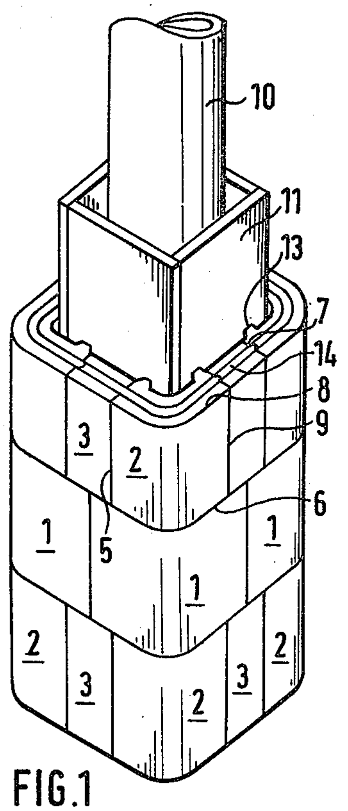
Figure 2:
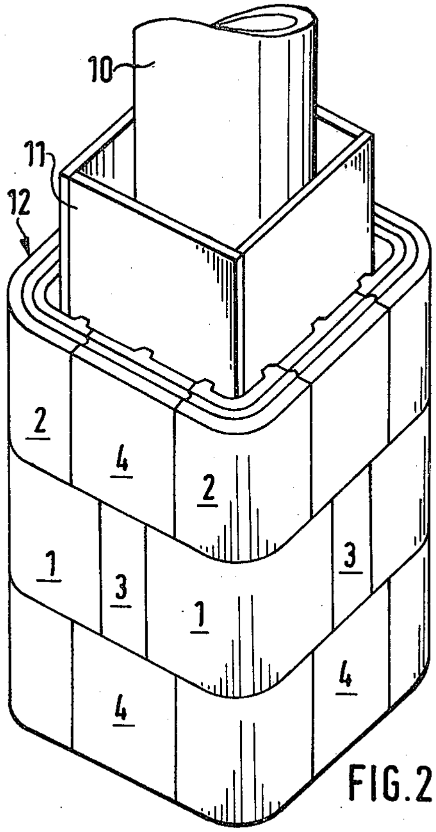

In FIGS. 1 and 2, a riser pipe(riser) of a heat-treating furnace can be seen comprising a two-layer refractory sheathing made from an inner layer of four rigid, commercially available insulating boards 11 cut rectangular and set up in a square and an outer layer of positively interengaging refractory shapes 12 of the same height throughout surrounding the latter. Three different shapes 12 are provided, namely equal-leg angle pieces 1 and 2 of different leg lengths, of which angle pieces 1 used in the second shape course have a greater leg length than the angle pieces 2 used in the first and third of the illustrated shape courses. Consequently, rectangular intermediate pieces 3 are provided between the angle pieces 2 of shorter leg length. As the angle pieces 1 have directly abutting sides, the length of the narrow intermediate piece 3 is equal to twice the difference between the leg lengths of the two angle pieces 1 and 2.

The sheathing in FIG. 2 serves for sheathing a larger riser pipe 10. It is built up, in principle, just like that in FIG. 1 but, both between the angle pieces 1 of greater leg length and also between the angle pieces 2 of smaller leg length, straight intermediate pieces 3 and 4 are provided in each case, of which the length of the intermediate pieces 3 corresponds to that of the intermediate pieces 3 of the sheathing in FIG. 1, whereas the length of intermediate pieces 4 between angle pieces 2 of smaller leg length is twice the length of the narrow intermediate pieces 3. The insulating boards 11 are also cut longer than for the sheathing in FIG. 1.

The shapes have, on their one side 5, and on their bottom side 6, in each case a groove 7 extending parallel to the edge, and on their other side 9, and on their top side 8, in each case a corresponding tongue 14. The two grooves 7 and the two tongues 14 are in each case square to one another. Thereby, all shapes are secured in a radial direction, and a positive interlock from shape course to shape course is brought about. On the inner face, the shapes have longitudinal ribs 13 to stand off from the insulating boards 11. Thereby, an air space is created between the shapes and the insulating boards 11. Another air space is created between the pipe and the corners of the insulating boards. This significantly increases the insulating effect of the sheathing as against a round insulation matched to the round circumference of the pipes having an insulating mat in overall contact.

Figure 3:
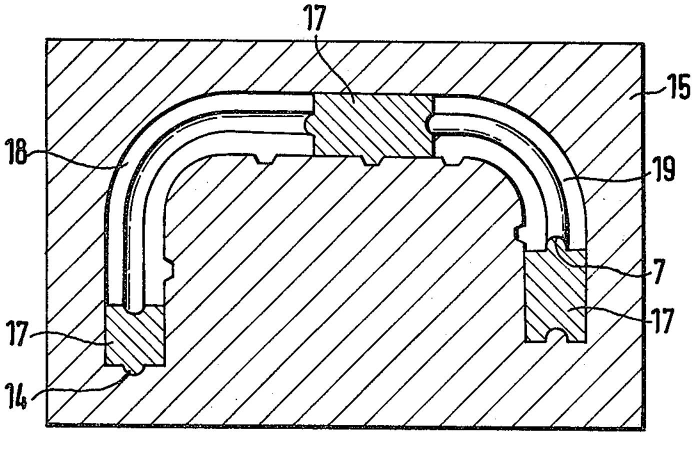
Figure 4:
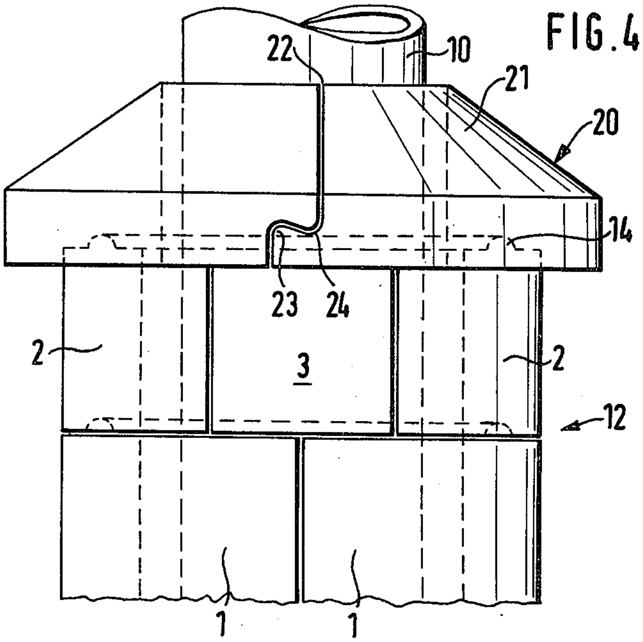
Figure 6:
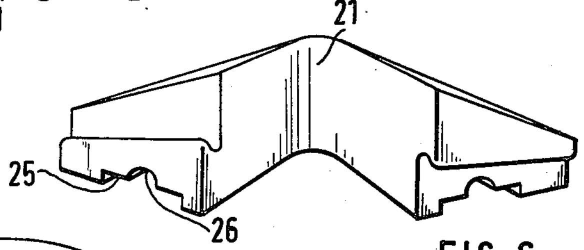
Figure 5:
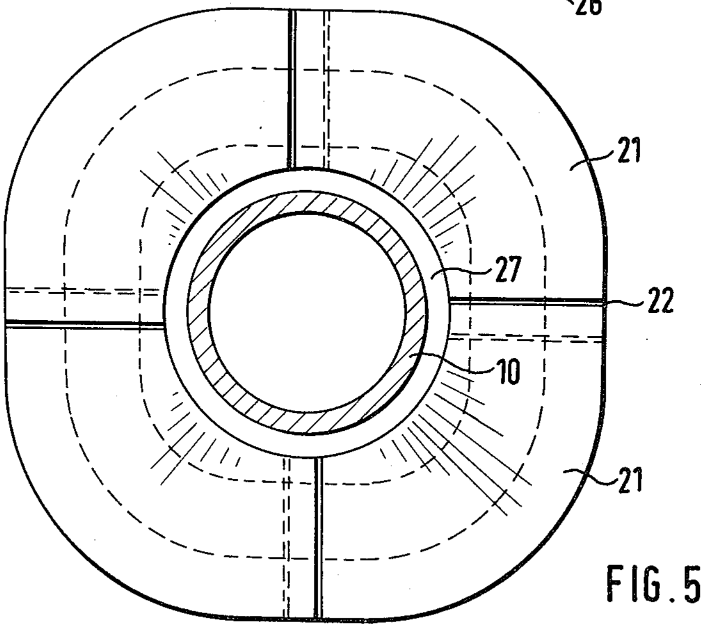

The angle pieces have rounded-off corners on their inner and outer face, as can be seen from the Figures. A single mould 15, shown in cross section in FIG. 3, serves for the manufacture of the shapes. An arcuate recess is formed in it having the form of an angle piece 1 with large leg length, an intermediate piece 3 adjoining downwards, an intermediate piece 4 of double length adjoining to the side, an angle piece 2 with short leg length adjoining further on to the side, and an intermediate piece 4 twice the length of the narrow intermediate piece 3 adjoining in turn. The size of the adjoining mould space could also be that of an intermediate piece three times the length of the narrow intermediate piece 3. The illustrated configuration features three inserts 17 of the size of the intermediate pieces 3 and 4. In this way, compression-moulding spaces 18 for an angle piece 1 and 19 for an angle piece 2 are defined. Filling-in of the spaces 18 and 19 with appropriately formed inserts and removing inserts 17 creates three mould spaces for intermediate pieces 3 and 4. Thus, it can be discerned that with a single basic mould all shapes can be manufactured, if the appropriate inserts are used in each case. This considerably simplifies manufacture.

In a customary configuration of the shapes, they are 70 mm thick, while the longitudinal ribs 13 are 10 mm high. The insulating boards 11 may be 20 mm thick. The commercially available insulating boards 11 which can be used withstand higher temperatures than the soft insulating mats or compression-moulded semi-cylindrical shells provided in other sheathing, for which reason a longer working life can be expected from the sheathing even if, owing to particular influences, the shapes are partially wrecked or particularly badly eroded. In any case, installation is facilitated.

The top closure for the insulating tower formed from the shapes 12 is expediently a covering cap 20, which overhangs the shapes inwards and outwards. A covering cap for a sheathing according to FIG. 1 can consist of four shapes 21 which are roof-shaped on their top side but otherwise constitute equal-leg angle pieces having rounded-off outer edges and a quandrantal inner walling. The slope and overhang have the effect that arising scale does not build up or—in the event that the furnace is operated with a molten charge—the slag on the cap overhang can drip off without damaging the refractory shapes 12 underneath. The cap is therefore expediently manufactured from a refractory material resistant to molten slag.

In order reliably to exclude the insulating tower made of shapes 12 coming apart, the covering cap is designed such that the four or more shapes are kept interlocked by means of a joggled joint 22, i.e., constitute an interlocking connection of interengaging matching side faces. For this purpose, the shapes of the covering cap 20 are configured step-shaped on their end faces with positively interengaging projections 23 and recesses 24. To guarantee a good interlock with the shapes 12 underneath, each angle piece 21 has on its bottom side a recess 25 matching the top contour of the shapes 12 and as wide as the thickness of the shapes 12. A groove 26 all the way round matches the tongue 14 on the top side of the shapes 12. The recess 25 all the way round and the tongue-and-groove connection with the shapes 12 absolutely locks the insulating tower in a desired position. The air gap 27 between cap and the riser pipe 10 should, in order to prevent foreign matter trickling in, be not too large and not too small, so that the riser pipe 10, which vibrates in operation, does not knock against the covering cap 20. For covering sheathings for larger pipes and double pipes, appropriate intermediate pieces can be placed between the angle pieces 21, as is likewise provided for in the case of the sheathing made of shapes 12 by means of the intermediate pieces 3 and 4.

For manufacturing the shapes 21 for the covering cap, a single steel basic/master mould can be used. The desired leg length and the desired inside diameter can be obtained by means of appropriate inserts. The advantages of the manufacture of shapes 12 apply analogously to the manufacture of these shapes.

I claim:

1. In a refractory sheathing made from insulating shapes for vertical support members, in particular riser pipes, in heat-treating furnaces, particularly pusher furnaces and walking beam furnaces fired from below, including an inner refractory, fibrous, insulating layer surrounding the support members and an outer layer formed of courses of positively interengaging refractory shapes of the same height in each course throughout surrounding said inner layer said shapes including angle pieces having legs extending substantially normal to one another and intermediate straight pieces extending between the legs of respective angle pieces in each course, the improvement comprising a first course having shapes including only equal-leg angle pieces and straight intermediate pieces and an adjacent second course having equal-leg angle pieces of different leg lengths from the angle pieces of said first course and straight intermediate pieces of different lengths than said straight pieces of said first course whereby the adjacent courses have staggered joints, each of said shapes having grooves on two contiguous sides at right angles, and tongues on both of the other contiguous sides at right angles, and said inner layer being formed of substantially rigid, flat insulating boards.

2. The improvement of claim 1 having angle pieces of only two different leg lengths.

3. The improvement of claim 2, each of said intermediate pieces having a length equal to twice the difference between the leg lengths of the angle pieces with which it interengages.

4. The improvement of claim 3, each of said intermediate pieces having a length equal to an integral multiple of twice the difference between the leg lengths of the angle pieces with which it interengages.

5. The improvement of claim 1, 2, 3 or 4, said shapes having longitudinal ribs on their inner face for engagement with the insulating boards.

6. The improvement of claim 1, 2, 3 or 4, said angle pieces having inside and outside, rounded off corners.

7. The improvement of claim 1, 2, 3 or 4 including a covering cap member engaging and overhanging the outer layer of shapes underneath it in an adjacent course and extending substantially adjacent to the support, said member formed of at least equal-leg length angle pieces having a bottom side with a recess which positively engages a top side of the outer layer of shapes in said adjacent course.

8. The improvement of claim 7, said pieces having step-shaped side faces defining projections and recesses to interengage with adjacent pieces.

* * * * *